United States Patent
Flory et al.

(10) Patent No.: US 11,499,021 B2
(45) Date of Patent: *Nov. 15, 2022

(54) FIBER MOLDING

(71) Applicant: BASF SE, Ludwigshafen am Rhein (DE)

(72) Inventors: Mirko Flory, Ludwigshafen am Rhein (DE); Michael Kalbe, Ludwigshafen am Rhein (DE); Hans Horler, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 68 days.

This patent is subject to a terminal disclaimer.

(21) Appl. No.: 16/882,435

(22) Filed: May 22, 2020

(65) Prior Publication Data
US 2020/0369840 A1  Nov. 26, 2020

(30) Foreign Application Priority Data

May 22, 2019 (EP) .................... 19175983

(51) Int. Cl.
*C08F 212/08* (2006.01)
*C08F 2/22* (2006.01)
*C08F 220/14* (2006.01)
*B29C 70/28* (2006.01)
*C08J 5/04* (2006.01)

(52) U.S. Cl.
CPC ............. *C08J 5/045* (2013.01); *B29C 70/28* (2013.01); *C08F 2/22* (2013.01); *C08F 212/08* (2013.01); *C08F 220/14* (2013.01); *C08J 2325/04* (2013.01); *C08J 2333/12* (2013.01)

(58) Field of Classification Search
CPC .... C08J 5/045; C08J 2325/04; C08J 2333/12; C08F 2/22; C08F 212/08; C08F 220/14; B29C 70/28
USPC .......................................................... 524/14
See application file for complete search history.

(56) References Cited

U.S. PATENT DOCUMENTS

| | | |
|---|---|---|
| 5,350,787 A | 9/1994 | Aydin et al. |
| 5,401,582 A | 3/1995 | Weyland et al. |
| 5,821,359 A | 10/1998 | Nelson et al. |
| 6,096,858 A | 8/2000 | Dobbelaar et al. |
| 6,632,326 B1 | 10/2003 | Hirano et al. |
| 8,012,389 B2 * | 9/2011 | Warnes ............... B27N 1/02 264/115 |

FOREIGN PATENT DOCUMENTS

| | | |
|---|---|---|
| DE | 4003422 A1 | 8/1991 |
| DE | 4213965 A1 | 11/1993 |
| DE | 19624299 A1 | 1/1997 |
| DE | 19621027 A1 | 11/1997 |
| DE | 19741184 A1 | 3/1999 |
| DE | 19741187 A1 | 3/1999 |
| DE | 19805122 A1 | 4/1999 |
| DE | 19828183 A1 | 12/1999 |
| DE | 19839199 A1 | 3/2000 |
| DE | 19840586 A1 | 3/2000 |
| DE | 19847115 C1 | 5/2000 |
| EP | 0040419 A2 | 11/1981 |
| EP | 0567812 A1 | 11/1993 |
| EP | 0614922 A2 | 9/1994 |
| EP | 0680810 A1 | 11/1995 |
| EP | 0771328 A1 | 5/1997 |
| GB | 2456915 A | 8/2009 |
| WO | 95/33775 A1 | 12/1995 |
| WO | 2005/077626 A1 | 8/2005 |
| WO | 2007/073218 A1 | 6/2007 |
| WO | 2011/095824 A1 | 8/2011 |
| WO | 2014/131683 A1 | 9/2014 |
| WO | 2014/131684 A1 | 9/2014 |
| WO | 2017/140520 A1 | 8/2017 |
| WO | 2020/030330 A1 | 2/2020 |

* cited by examiner

*Primary Examiner* — Kelechi C Egwim
(74) *Attorney, Agent, or Firm* — Faegre Drinker Biddle & Reath LLP

(57) ABSTRACT

A process for producing a thermoformable and/or -embossable fiber/polymer composite using a fibrous lignocellulosic substrate S and a polymer P, which contains
  i) homogeneously mixing the substrate S and the polymer P, then
  ii) converting the substrate S/polymer P mixture to a fiber web, and then
  iii) compacting the resultant fiber web at a temperature not less than the glass transition temperature of the polymer P [$Tg^P$] to give a thermoformable and/or -embossable fiber/polymer composite,
wherein
a) the substrate S comprises acetylated lignocellulosic fibers, and
b) the polymer P is thermoplastic and has a $Tg^P \geq 20°$ C. The invention relates to a fiber/polymer molding obtainable by the process and a component in motor vehicle construction, in built structures and in furniture which contains the fiber/polymer molding.

11 Claims, No Drawings

FIBER MOLDING

CROSS-REFERENCE TO RELATED APPLICATIONS

This application claims priority to European Application No. 19175983.6, filed May 22, 2019 which is incorporated herein by reference in its entirety.

The present invention provides a process for producing a thermoformable and/or -embossable fiber/polymer composite using a fibrous lignocellulosic substrate S and a polymer P, which comprises i) homogeneously mixing the substrate S and the polymer P, then ii) converting the substrate S/polymer P mixture to a fiber web, and then iii) compacting the resultant fiber web at a temperature not less than the glass transition temperature of the polymer P [$Tg^P$] to give a thermoformable and/or -embossable fiber/polymer composite, wherein a) the substrate S comprises acetylated lignocellulosic fibers, and b) the polymer P is thermoplastic and has a $Tg^P \geq 20°$ C. measured to DIN EN ISO 11357-2 (2013-05).

The present invention further provides the fiber/polymer composites themselves that are obtainable by the process of the invention and for the use thereof for production of fiber/polymer moldings, for example components in motor vehicle construction, in built structures and in furniture.

Wood fiberboards are produced essentially proceeding from round timber, but also from woodchips or what are called slabs. After the round timber has been debarked, the round timber, just like the slabs, is comminuted in drum chippers to give woodchips. After contaminants such as sand or stones have been removed, the woodchips are first subjected to a hydrothermal pretreatment by means of steam in a preliminary steam vessel at 100° C. Thereafter, the presteamed woodchips are transferred to what is called the boiler, where they are exposed to a temperature of 140 to 180° C. and a pressure of 4 to 8 bar (gauge) in water for two to five minutes. Thereafter, the softened woodchips are transferred into what is called the refiner, where they are ground and at the same time defibrated, likewise at a pressure of 4 to 8 bar (gauge), between two fluted grinding disks that rotate relative to one another at a distance of about 3 to 0.1 mm. Subsequently, the aqueous wood fiber pulp obtained is transferred into what is called the blowline, a tube having a much lower pressure, the effect of which is that the water evaporates and thus serves as a gaseous transport medium for the wood fibers through the blowline (hydropneumatic conveying). By additional blowing of heated dry air into the blowline, the wood fibers are dried and transported onward pneumatically. In order to assure very substantially uniform application of the aqueous thermosetting binder required for production of the wood fiberboards, such as, in particular, formaldehyde resins such as urea/formaldehyde, phenol/formaldehyde, melamine/formaldehyde, melamine/urea/formaldehyde or melamine/phenol/formaldehyde resins, or isocyanates such as methylene diisocyanate or toluidine diisocyanate, to the fibers, the aqueous thermosetting binder is sprayed into the blowline at one or more sites prior to the blowing-in of the heated dry air. The "glued" fibers obtained after the drying are separated out and converted to a fiber web (fiber mat). This fiber mat is optionally compressed by means of a 'cold' preliminary compression and then pressed under pressure and at high temperature (150 to 230° C.) to give a woodbase material in slab form having a density of 250 to 1000 kg/m³. However, the use of thermosetting binders means that the wood fiberboards thus obtained are no longer thermoformable.

For production of thermoformable shaped bodies, especially wood fiberboards, WO 2007/73218 gives a quite general disclosure of the use of thermoplastic binders in liquid or particulate form. In this connection, aqueous binder dispersions are among those mentioned. However, thermoplastic binders disclosed are quite generally suitable polymers, and a multitude of completely different polymers are mentioned in an unspecific manner, for example acrylate polymers, urethane polymers, polyvinyl chloride, polystyrene, polyvinyl alcohol, polyamides, polyesters, but also starches and derivatives thereof, cellulose derivatives, proteins, polyacids, polyisocyanates, and also reactive resin systems such as epoxy resins, unsaturated polyesters, urethane/isocyanate resins or precondensates of a wide variety of different formaldehyde resins, etc. In the examples, pellets, fibers, powders or flakes of polypropylene, acid-modified polypropylene, polylactic acid fibers, polyvinyl alcohol, polyolefin copolymer dispersions, such as ethylene/acrylic acid or ethylene/maleic anhydride copolymer dispersions, are used without further specification.

An improved process for producing thermoformable fiber/polymer composites is described in WO 2017/140520, according to which an aqueous polymer dispersion obtainable via a specific aqueous emulsion polymerization is contacted with a fibrous substrate in a gas stream, advantageously in a blowline, then dried and compacted to give a thermoformable fiber/polymer composite which is then converted in a downstream process step to a fiber/polymer molding. However, if these fiber/polymer moldings have sharp edges or have surfaces that are not smooth but embossed with a pattern, for example in accordance with a woodgrain or a geometric pattern, these sharp-edged and/or embossed fiber/polymer moldings are not always fully satisfactory in terms of their water resistance.

An improved process for producing thermoformable fiber/polymer composites is described in the priority-substantiating European patent application with application number EP 18188499.0 that was yet to be published at the priority date of the present application, according to which a specific aqueous polymer dispersion and additionally a di- or polyisocyanate compound is contacted with a fibrous substrate in a gas stream, advantageously in a blowline, then dried and compacted to give a thermoformable fiber/polymer composite which is then converted in a downstream process step to a fiber/polymer molding.

However, what is unsatisfactory about the aforementioned processes is that the resultant thermoformable fiber/polymer composites and the fiber/polymer moldings obtainable therefrom, depending on the nature and amount of the binder and the nature and amount of fibrous lignocellulosic substrates, still have unsatisfactory thickness swelling on contact with water.

It was therefore an object of the present invention to provide a process for producing a thermoformable and/or -embossable fiber/polymer composite and a fiber/polymer molding obtainable therefrom, wherein their thickness swelling that results from contact with water can be lowered or controlled to a certain degree.

This object was surprisingly achieved by the process defined at the outset.

It is a characterizing feature of the process of the invention that a fibrous lignocellulosic substrate S is used for production of the fiber/polymer composite. According to the invention, any fibrous lignocellulosic substrates may be used. A fibrous lignocellulosic substrate shall be understood here to mean those particles that are formed essentially from lignocellulose and have a ratio of their longest dimension to their shortest dimension of at least ≥5, advantageously ≥10 and especially advantageously ≥50, and have a shortest dimension of ≤2 mm, advantageously ≥0.001 and ≤0.5 mm and especially advantageously ≥0.001 and ≤0.1 mm. It is essential that the shortest dimension is determined at an angle of 90° to the connecting line of the longest dimension of the particles.

The fibrous lignocellulosic substrates S are essentially plant fibers, for example cotton fibers, flax fibers, hemp fibers, kenaf fibers, jute fibers, sisal fibers or advantageously wood fibers, the production of the aforementioned fibers being familiar to the person skilled in the art.

For instance, wood fibers are advantageously produced proceeding from round timber, but also from woodchips or what are called slabs. After the round timber has been debarked, the round timber, just like the slabs, is comminuted in drum chippers to give woodchips. After contaminants such as sand or stones have been removed, the woodchips are first subjected to a hydrothermal pretreatment by means of steam in a preliminary steam vessel at 100° C. Thereafter, the pre-steamed woodchips are transferred to what is called the boiler, where they are exposed to a temperature of 140 to 180° C. and a pressure of 4 to 8 bar (gauge) in water for two to five minutes. Thereafter, the softened woodchips are transferred into what is called the refiner, where they are ground and at the same time defibrated, likewise at a pressure of 4 to 8 bar (gauge), between two fluted grinding disks that rotate relative to one another at a distance of about 3 to 0.1 mm. Subsequently, the resultant aqueous wood fiber slurry is dried in a drier, for example in a drying tower, a fluidized bed drier or what is called a blowline. More particularly, wood fibers are produced using softwood such as, in particular, spruce wood or pine wood, and hardwood such as, in particular, beech wood or eucalyptus wood.

What is essential to the process is that the fibrous substrate S comprises acetylated lignocellulosic fibers. The production of acetylated lignocellulosic fibers (also referred to hereinafter as 'acetylated fibers') is familiar to the person skilled in the art and is effected essentially either by direct acetylation of lignocellulosic fibers (see, for example, U.S. Pat. No. 5,821,359) or preferably by the comminution of acetylated wood. What the person skilled in the art understands by acetylated wood is wood that has been treated with acetic anhydride in a process for chemical modification of wood. The preparation of acetylated wood with acetic anhydride is advantageously effected proceeding from dry wood, it being possible in principle to acetylate any kind of wood. But since every type of wood behaves somewhat differently in the acetylation, the acetylation has to be matched to the particular type of wood and to achieve the desired product properties. For example, oak wood and spruce wood is considered to be difficult to acetylate, whereas alder, poplar and birch wood is considered easy. The production of acetylated wood is familiar in principle to the person skilled in the art (in this regard, see, for example: Holger Militz, Übersichtsbericht-Acetyliertes Holz-[Naturwissenschaftliche und technologische Grundlagen, materialtechnische und ökonomische Möglichkeiten und Grenzen, aktueller Stand der Umsetzung] {Overview Report-Acetylated Wood-[Fundamentals in Relation to Natural Science and Technology, Material-related and Economic Opportunities and Limits, Current State of Implementation]}; SGD Süd-Forstliche Versuchsanstalt Rheinland-Pfalz, 2011, accessible online at 'http://www.wald-rlp.de/fileadmin/website/fawfseiten/fawf/downloads/Projekte/Seeg/acetylierungsübersic ht.pdf'; Ulf Lohmann: Holzlexikon {Wood Lexicon}, 4th edition, Nikol Verlagsgesellschaft, Hamburg 2010; A. Callum, S. Hill: Wood Modification: Chemical, Thermal and Other Processes, Wiley 2006; GB-A 2456915, U.S. Pat. No. 6,632, 326, EP-A 680810, WO 2005/077626, WO 2011/095824, WO 2014/131683 or WO 2014/131684. Wood treated in this way—also commercially available as 'Accoya wood'—is used for outdoor wood constructions, for example bridges or support frames, owing to its hardness and resistance to moisture. Acetylated fibers used in accordance with the invention are advantageously produced by the comminuting of acetylated wood, especially by the above-described process for producing wood fibers. For reasons of cost, offcuts or wastes as obtained in the production of corresponding wood beams or wood construction elements are frequently used for this purpose.

The quantitative proportion of acetylated fibers in the substrate S is widely variable and ultimately dependent on the maximum tolerable thickness swelling of the fiber/polymer composite to be produced or of the fiber/polymer molding obtainable therefrom that results from contact with water. According to the invention, the proportion of acetylated fibers in the substrate S is ≥0.1% by weight, frequently ≥10% by weight, ≥20% by weight, ≥30% by weight or ≥40% by weight, advantageously ≥50% by weight, ≥60% by weight, ≥70% by weight, ≥80% by weight or ≥90% by weight and particularly advantageously 100% by weight, and frequently <100% by weight, ≤90% by weight, ≤80% by weight, ≤70% by weight, ≤60% by weight, but also ≤50% by weight, ≤40% by weight, ≤30% by weight, ≤20% by weight or ≤10% by weight. The proportions of acetylated fibers in the substrate S are particularly advantageously in the range of ≥50% and ≤100% by weight or ≥80% and ≤100% by weight.

A further essential component used in the process is a thermoplastic polymer P having a glass transition temperature $Tg^P$ measured to DIN EN ISO 11357-2 (2013-05) of ≥20° C., advantageously ≥60° C. and especially advantageously ≥90° C.

Thermoplastic polymers P are understood here to mean those polymers that can be deformed within a particular temperature range (≥$Tg^P$), this operation being reversible, which means nothing more than that the operation can be repeated multiple times by cooling and reheating. However, it should be noted that the corresponding polymer must not be heated to such an extent that thermal breakdown of the polymer sets in. Thermoplastic polymers should be fundamentally distinguished from the thermoset polymers (thermoset) that are not reversibly deformable after they have been produced, for example by curing.

Thermoplastic polymers usable in the process are all of those that have a glass transition temperature ascertained by the aforementioned determination method of ≥20° C., for example acrylonitrile/butadiene/styrene copolymers, polyamides, polyacetates, homo- or copolymers of (meth)acrylates, polycarbonates, polyesters, for example polyethylene terephthalates, polyolefins, for example polyethylenes or polypropylenes, acid-modified polypropylenes, polystyrenes, polyetherketones, polylactic acid, ethylene/acrylic acid copolymers or polyvinylchlorides. The thermoplastic polymer P may in principle be used here in neat form, in aqueous dispersion and in aqueous solution. If the polymer P is used in neat form, the polymer may be used in powder, flake or fiber form. Examples of these are polyethylene or polypropylene powders, flakes or fibers. However, preference is given to using aqueous dispersions of polymers P. Aqueous polymer solutions of thermoplastic polymers generally play merely a minor role.

Advantageously, the polymer P is used in the form of an aqueous dispersion (also referred to hereinafter as 'aqueous polymer P dispersion'), prepared by free-radically induced aqueous emulsion polymerization of ethylenically unsaturated monomers P [monomers P]. Particularly advantageously, the aqueous polymer P dispersion is prepared by free-radically initiated emulsion polymerization of monomers P in an aqueous medium in the presence of a polymer A, where the polymer A is formed from

| | |
|---|---|
| 80% to 100% by weight of | at least one ethylenically unsaturated mono- and/or dicarboxylic acid [monomers A1] and |
| 0% to 20% by weight of | at least one further ethylenically unsaturated monomer which differs from the monomers A1 [monomers A2], | in copolymerized form, and where the monomers P are chosen in terms of type and amount such that the resulting polymer P has a $Tg^P \geq 20°$ C.

Useful monomers A1 especially include α,β-monoethylenically unsaturated mono- and dicarboxylic acids having from 3 to 6 carbon atoms, possible anhydrides of these, and also water-soluble salts of these, in particular alkali metal salts of these, examples being acrylic acid, methacrylic acid, maleic acid, fumaric acid, itaconic acid, citraconic acid, tetrahydrophthalic acid, and anhydrides of these, for example maleic anhydride, and also the sodium or potassium salts of the abovementioned acids. Particular preference is given to acrylic acid, methacrylic acid, maleic acid and/or maleic anhydride, and acrylic acid is especially preferred.

Useful monomers as the at least one monomer A2 for preparation of the polymer A used in accordance with the invention are especially ethylenically unsaturated compounds that are free-radically copolymerizable with monomer A1 in a simple manner, for example ethylene, vinylaromatic monomers such as styrene, α-methylstyrene, o-chlorostyrene or vinyltoluenes, vinyl halides such as vinyl chloride or vinylidene chloride, esters derived from vinyl alcohol and from monocarboxylic acids having 1 to 18 carbon atoms, for example vinyl acetate, vinyl propionate, vinyl n-butyrate, vinyl laurate, and vinyl stearate, esters derived from α,β-monoethylenically unsaturated mono- and dicarboxylic acids having preferably from 3 to 6 carbon atoms, particular examples being acrylic acid, methacrylic acid, maleic acid, fumaric acid, and itaconic acid, with alkanols generally having 1 to 12, preferably 1 to 8 and especially 1 to 4 carbon atoms, particular examples being the methyl, ethyl, n-butyl, isobutyl, pentyl, hexyl, heptyl, octyl, nonyl, decyl, and 2-ethylhexyl esters of acrylic and of methacrylic acid, the dimethyl or di-n-butyl esters of fumaric and of maleic acid, nitriles of α,β-monoethylenically unsaturated carboxylic acids, for example acrylonitrile, methacrylonitrile, fumaronitrile, maleonitrile, and also $C_{4-8}$-conjugated dienes, such as 1,3-butadiene (butadiene) and isoprene. The monomers mentioned are generally the main monomers, and these combine to form a proportion of ≥50% by weight, preferably ≥80% by weight and especially preferably ≥90% by weight, based on the entirety of monomers A2, or indeed form the entirety of monomers A2. The solubility of these monomers in water under standard conditions [20° C., 1 atm (absolute)] is very generally only moderate to low.

Monomers A2 which have higher water solubility under the abovementioned conditions are those which comprise either at least one sulfo group and/or anion corresponding thereto or at least one amino, amido, ureido, or N-heterocyclic group, and/or nitrogen-protonated or -alkylated ammonium derivatives thereof. Examples include acrylamide and methacrylamide, and also vinylsulfonic acid, 2-acrylamido-2-methylpropanesulfonic acid, styrenesulfonic acid, and water-soluble salts thereof, and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino) ethyl methacrylate, N-(3-N',N'-dimethylaminopropyl)methacrylamide, and 2-(1-imidazolin-2-onyl)ethyl methacrylate.

The abovementioned water-soluble monomers A2 are usually present merely as modifying monomers in amounts of ≤10% by weight, preferably ≤5% by weight and especially preferably ≤3% by weight, based on the entirety of monomers A2.

Monomers A2 which typically increase the internal strength of the filmed polymer matrix normally have at least one epoxy, hydroxyl, N-methylol, or carbonyl group, or at least two non-conjugated ethylenically unsaturated double bonds. Examples thereof include monomers comprising two vinyl moieties, monomers having two vinylidene moieties and also monomers having two alkenyl moieties. Particularly advantageous monomers here are the diesters of dihydric alcohols with α,β-monoethylenically unsaturated monocarboxylic acids, preference among these being given to acrylic and methacrylic acid. Examples of monomers of this kind that have two non-conjugated ethylenically unsaturated double bonds are alkylene glycol diacrylates and alkylene glycol dimethacrylates, for example ethylene glycol diacrylate, propylene 1,2-glycol diacrylate, propylene 1,3-glycol diacrylate, butylene 1,3-glycol diacrylate, butylene 1,4-glycol diacrylate and ethylene glycol dimethacrylate, propylene 1,2-glycol dimethacrylate, propylene 1,3-glycol dimethacrylate, butylene glycol 1,3-dimethacrylate, butylene glycol 1,4-dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Other materials of particular significance in this context are the $C_1$-$C_8$-hydroxyalkyl esters of methacrylic and of acrylic acid, for example n-hydroxyethyl, n-hydroxypropyl, or n-hydroxybutyl acrylate and the corresponding methacrylate, and also compounds such as diacetoneacrylamide and acetylacetoxyethyl acrylate and the corresponding methacrylate. Frequently, the aforementioned crosslinking monomers A2 are used in amounts of ≤10% by weight, but preferably in amounts of ≤5% by weight, based in each case on the entirety of monomers A2. However, it is especially preferable not to use any of these crosslinking monomers A2 to prepare the polymer A.

Advantageously, the polymers A are prepared by using, as monomers A2, only those monomer mixtures which comprise 90 to 100% by weight of esters of acrylic and/or methacrylic acid with alkanols having 1 to 12 carbon atoms, or
90 to 100% by weight of styrene and/or butadiene, or
90 to 100% by weight of vinyl chloride and/or vinylidene chloride, or
90 to 100% by weight of vinyl acetate, vinyl propionate and/or ethylene.

According to the invention, the copolymerized proportion of monomers A2 in the polymer A is 0% to 20% by weight, advantageously ≤10% by weight or ≤5% by weight and 0.1% by weight. In a further advantageous embodiment, the polymer A does not comprise any monomers A2 in copolymerized form at all. Accordingly, polymer A is formed to an extent of ≥80% by weight, advantageously to an extent of ≥90% by weight or ≥95% by weight, and in a further embodiment to an extent of 100% by weight of monomers A1 in copolymerized form, particularly preferred monomers A1 being acrylic acid, methacrylic acid, maleic acid and/or maleic anhydride.

The polymers A used in accordance with the invention are generally prepared by free-radically initiated polymerization of the monomers A in an aqueous medium. Advantageously, the polymers A are prepared in the presence of at least one free-radical chain transfer agent, particular preference being given to sulfur-, nitrogen- and/or phosphorus-containing free-radical chain transfer agents having a solubility of ≥5 g/100 g of water in deionized water at 20° C. and 1 atm.

Sulfur-containing free-radical chain transfer agents used are, for example, mercaptoalkanols such as 2-mercaptoethanol, 2-mercaptopropanol or 3-mercaptopropanol, alkali metal hydrogensulfites such as sodium hydrogensulfite or potassium hydrogensulfite, and thiosulfuric acid and the alkali metal salts thereof or 3-mercapto-2-aminopropanoic acid (cysteine), nitrogen-containing free-radical chain transfer agents used are, for example, hydroxylamine(ammonium) compounds such as hydroxylammonium sulfate, and phosphorus-containing free-radical chain transfer agents used are, for example, phosphorous acid, hypophosphorous acid, metaphosphorous acid, orthophosphoric acid, pyrophosphoric acid or polyphosphoric acid and the alkali metal salts thereof, especially the sodium or potassium salts thereof, advantageously sodium hypophosphite or sodium dihydrogenphosphate.

Especially advantageously, the free-radical chain transfer agent is selected from hypophosphorous acid and the alkali metal salts thereof, especially sodium hypophosphite, alkali metal hydrogensulfites, especially sodium hydrogensulfite, hydroxylammonium sulfate and/or 2-mercaptoethanol.

In the preparation of the polymers A, it is advantageous when the type and amount of the free-radical chain transfer agent is chosen such that the number-average molecular weight of the polymers A is ≥1000 and ≤30 000 g/mol, preferably 1000 and ≤20 000 g/mol and especially advantageously ≥3000 and ≤20 000 g/mol. The corresponding polymerization conditions are known to the person skilled in the art or can be ascertained by such a person in simple routine tests.

In the context of this document, the molecular weight is generally determined for the polymers A using two series-connected Tosoh TSKgel G 3000 PWXL columns at a temperature of 35° C., with an eluent consisting of deionized water with 0.01 mol/l phosphate buffer, pH 7.4, and 0.01 mol/l NaN$_3$, a flow rate of 0.5 ml per minute, an injection volume of 100 µl, a concentration of the injected solution of 1 to 2 mg/ml, and a DRI detector from Agilent Technologies GmbH. The internal standard/calibration substance used was polyacrylic acid sodium salt with different defined molecular weights.

The principles underlying the preparation of the polymers A are familiar to the person skilled in the art (see by way of example A. Echte, Handbuch der Technischen Polymerchemie [Handbook of Industrial Polymer Chemistry], chapter 6, VCH, Weinheim, 1993 or B. Vollmert, Grundriss der Makromolekularen Chemie [Principles of Macromolecular Chemistry], vol. 1, E. Vollmert Verlag, Karlsruhe, 1988).

It is significant in accordance with the invention that the polymer A can in principle be used either in the acid form or else in a partly or fully neutralized form, using the bases customary in industry for partial or full neutralization, such as the hydroxides of the alkali metals and alkaline earth metals, such as sodium hydroxide or potassium hydroxide in particular, and additionally also ammonium hydroxide. Preferably in accordance with the invention, the polymers A are used in partly neutralized form in aqueous medium, using the base advantageously to establish a pH in the range of ≥1 and ≤6 and particularly advantageously ≥2 and ≤4.

In the preparation of the polymer P used in accordance with the invention, it is possible if appropriate to initially charge a portion or the entirety of polymers A in the aqueous polymerization medium. Alternatively, it is possible to meter in the entirety or any remaining residual amount of polymers A together with the monomers P during the polymerization reaction. The manner in which the entirety or any remaining residual amount of polymers A is metered into the aqueous polymerization medium here can be discontinuous in one or more portions, or continuous with constant or varying flow rates. Advantageously, the entirety of polymers A is initially charged in the aqueous polymerization medium prior to triggering of the polymerization reaction of the monomers P. In a further advantageous embodiment, the polymer A is prepared in situ in the polymerization medium for the polymerization of the monomers P.

What is significant is that the aqueous polymerization medium, in the preparation of the polymer P, as well as the polymer A, may additionally also comprise dispersing aids which keep both the monomer droplets and the dispersion particles of the polymer P obtained by the free-radically initiated polymerization of the monomers P dispersed in the aqueous phase and hence ensure the stability of the aqueous polymer composition produced. These may be not only the protective colloids usually used in the conduct of free-radical aqueous emulsion polymerization reactions, but also emulsifiers.

Suitable protective colloids are, for example, polyvinyl alcohols, cellulose derivatives or copolymers comprising vinyl pyrrolidone. A detailed description of further suitable protective colloids may be found in Houben-Weyl, Methoden der organischen Chemie, vol. XIV/1, Makromolekulare Stoffe, pages 411 to 420, Georg-Thieme-Verlag, Stuttgart, 1961. Since the polymer A used in accordance with the invention can also act as a protective colloid, it is advantageous in accordance with the invention not to use any additional protective colloids.

It is of course also possible to use mixtures of emulsifiers and/or protective colloids. Dispersing aids frequently used are exclusively emulsifiers having relative molecular weights that are typically below 1000 g/mol, by contrast with the protective colloids. They may be either anionic, cationic, or nonionic. When mixtures of surface-active substances are used, the individual components must of course be compatible with one another and this may be checked using a few preliminary experiments if there is any doubt.

Anionic emulsifiers are generally compatible with one another and with nonionic emulsifiers. The same also applies to cationic emulsifiers, whereas anionic and cationic emulsifiers are mostly not compatible with one another.

Commonly used emulsifiers are, for example, ethoxylated mono-, di- and trialkylphenols (EO level: 3 to 50, alkyl radical: $C_4$ to $C_{12}$), ethoxylated fatty alcohols (EO level: 3 to 50; alkyl radical: $C_8$ to $C_{36}$) and alkali metal and ammonium salts of alkyl sulfates (alkyl radical: $C_8$ to $C_{12}$), of sulfuric monoesters of ethoxylated alkanols (EO level: 3 to 30, alkyl radical: $C_{12}$ to $C_{18}$) and ethoxylated alkylphenols (EO level: 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$). Further suitable emulsifiers are found in Houben-Weyl, Methoden der organischen Chemie, vol. XIV/1, Makromolekulare Stoffe, pages 192 to 208, Georg-Thieme-Verlag, Stuttgart, 1961.

Further useful interface-active substances have been found to be compounds of the general formula I

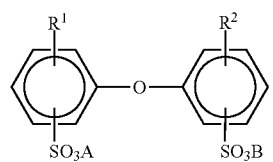

(I)

in which $R^1$ and $R^2$ are $C_4$- to $C_{24}$-alkyl and one of the $R^1$ and $R^2$ radicals may also be hydrogen, and A and B may be alkali metal ions and/or ammonium ions. In the general formula I, $R^1$ and $R^2$ are preferably linear or branched alkyl radicals having 6 to 18 carbon atoms, especially having 6, 12 or 16 carbon atoms, or hydrogen atoms, where $R^1$ and $R^2$ are not both simultaneously hydrogen atoms. A and B are preferably sodium, potassium or ammonium ions, with sodium ions being particularly preferred. Particularly advantageous compounds I are those in which A and B are sodium ions, $R^1$ is a branched alkyl radical having 12 carbon atoms and $R^2$ is a hydrogen atom or $R^1$. Technical grade mixtures comprising a proportion of 50% to 90% by weight of the monoalkylated product, for example Dowfax® 2A1 (brand of Dow Chemical Company), are frequently used. The compounds I are common knowledge, for example from U.S. Pat. No. 4,269,749, and are commercially available.

If dispersing aids are included in the preparation of the aqueous polymer P dispersions, the total amount of dispersing aids used, especially emulsifiers, is 0.1% to 5% by weight, preferably 1% to 3% by weight, based in each case on the total amount of the monomers P (total amount of monomers P). In an advantageous embodiment, emulsifiers are used as the sole dispersing aids.

If dispersing aids are included in the preparation of the aqueous polymer P dispersions, it is possible if appropriate to initially charge a portion or the entirety of dispersing aids as a constituent of the aqueous medium comprising the polymer A. Alternatively, it is possible to meter in the entirety or any remaining residual amount of dispersing aids together with the monomers P during the polymerization reaction. The manner in which the entirety or any remaining residual amount of dispersing aids is metered into the aqueous polymerization medium here can be discontinuous in one or more portions, or continuous with constant or varying flow rates.

It is essential to the invention that, in the free-radically initiated aqueous emulsion polymerization of the monomers P, these are chosen in terms of type and amount such that the polymer P obtained has a glass transition temperature $Tg \geq 20°$ C., advantageously $\geq 60°$ C. and especially advantageously $\geq 90°$ C., measured according to DIN EN ISO 11357-2 (2013-05).

The conduct of free-radically initiated emulsion polymerizations of ethylenically unsaturated compounds (monomers) in an aqueous medium has already been widely described and is therefore well known to the person skilled in the art [in this regard see Emulsionspolymerisation [Emulsion Polymerization] in Encyclopedia of Polymer Science and Engineering, volume 8, pages 659 ff. (1987); D. C. Blackley, in High Polymer Latices, volume 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer [Dispersions of Synthetic High Polymers], F. Hölscher, Springer-Verlag, Berlin (1969)]. The free-radically initiated aqueous emulsion polymerization is typically effected by dispersing the monomers, generally with inclusion of dispersing aids, such as emulsifiers and/or protective colloids, in aqueous medium and polymerizing them using at least one water-soluble free-radical polymerization initiator. Frequently, the residual contents of unconverted monomers in the aqueous polymer dispersions obtained are reduced using chemical and/or physical methods likewise known to a person skilled in the art [see for example EP-A 771328, DE-A 19624299, DE-A 19621027, DE-A 19741184, DE-A 19741187, DE-A 19805122, DE-A 19828183, DE-A 19839199, DE-A 19840586 and 19847115], the polymer solids content is adjusted to a desired value by diluting or concentrating, or further customary added substances, for example foam- or viscosity-modifying additives, are added to the aqueous polymer dispersion. The preparation of an aqueous polymer P dispersion used in accordance with the invention differs from this general procedure merely in that the monomers P are polymerized—in a preferred embodiment in the presence of at least one polymer A—and are chosen in terms of type and amount such that the polymers P formed have a glass transition temperature $Tg \geq 20°$ C. measured according to DIN EN ISO 11357-2 (2013-05). It will be appreciated here that, for preparation of the polymers P, the scope of the present document is also to include the seed, staged and gradient modes of polymerization that are familiar to the person skilled in the art. If staged polymers are used, at least the polymer from one stage has a glass transition temperature $Tg \geq 20°$ C. Advantageously at least 50% by weight and particularly advantageously at least 90% by weight of the staged polymer comprises a polymer P having a glass transition temperature $Tg \geq 20°$ C., advantageously $\geq 60°$ C. and especially advantageously $\geq 90°$ C. Advantageously in accordance with the invention, however, one-stage polymers having a glass transition temperature $Tg \geq 20°$ C., advantageously $\geq 60°$ C. and especially advantageously $\geq 90°$ C. are used as polymers P.

Useful monomers P are especially ethylenically unsaturated monomers that are free-radically polymerizable in a simple manner, for example ethylene, vinylaromatic monomers such as styrene, α-methylstyrene, o-chlorostyrene or vinyltoluenes, vinyl halides such as vinyl chloride or vinylidene chloride, esters derived from vinyl alcohol and from monocarboxylic acids having 1 to 18 carbon atoms, for example vinyl acetate, vinyl propionate, vinyl n-butyrate, vinyl laurate, and vinyl stearate, esters derived from α,β-monoethylenically unsaturated mono- and dicarboxylic acids having preferably from 3 to 6 carbon atoms, particular examples being acrylic acid, methacrylic acid, maleic acid, fumaric acid, and itaconic acid, with alkanols generally having 1 to 12, preferably 1 to 8 and especially 1 to 4 carbon atoms, particular examples being the methyl, ethyl, n-butyl, isobutyl, pentyl, hexyl, heptyl, octyl, nonyl, decyl, and 2-ethylhexyl esters of acrylic and of methacrylic acid, the dimethyl or di-n-butyl esters of fumaric and of maleic acid, nitriles of α,β-monoethylenically unsaturated carboxylic acids, for example acrylonitrile, methacrylonitrile, fumaronitrile, maleonitrile, and also $C_{4-8}$-conjugated dienes, such as 1,3-butadiene and isoprene. The monomers mentioned are generally the main monomers, and these combine to form a proportion of ≥80% by weight and preferably ≥90% by weight, based on the amount of all monomers P used to prepare the polymer P (total amount of monomers P). The solubility of these monomers in water under standard conditions [20° C., 1 atm] is very generally only moderate to low.

Monomers P which have higher water solubility under the abovementioned conditions are those which comprise either at least one acid group and/or anion corresponding thereto or at least one amino, amido, ureido, or N-heterocyclic group, and/or nitrogen-protonated or -alkylated ammonium derivatives thereof. Examples include α,β-monoethylenically unsaturated mono- and dicarboxylic acids and amides thereof, e.g. acrylic acid, methacrylic acid, maleic acid, fumaric acid, itaconic acid, acrylamide, and methacrylamide, and also vinylsulfonic acid, 2-acrylamido-2-methylpropanesulfonic acid, styrenesulfonic acid, and water-soluble salts thereof, and also N-vinylpyrrolidone, 2-vinylpyridine, 4-vinylpyridine, 2-vinylimidazole, 2-aminoethyl acrylate, 2-aminoethyl methacrylate, 2-aminopropyl acrylate, 2-aminopropyl methacrylate, 3-aminopropyl acrylate, 3-aminopropyl methacrylate, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide and 2-(1-imidazolin-2-onyl)ethyl methacrylate. The aforementioned monomers P are normally present merely as modifying monomers in amounts of ≤10% by weight and preferably ≤5% by weight, based on the total amount of monomers P.

Monomers P which typically increase the internal strength of the filmed polymer matrix normally have at least one epoxy, hydroxyl, N-methylol or carbonyl group, or at least two non-conjugated ethylenically unsaturated double bonds. Examples thereof include monomers comprising two vinyl moieties, monomers having two vinylidene moieties and also monomers having two alkenyl moieties. Particularly advantageous monomers here are the diesters of dihydric alcohols with α,β-monoethylenically unsaturated monocarboxylic acids, preference among these being given to acrylic and methacrylic acid. Examples of monomers of this type having two non-conjugated ethylenically unsaturated double bonds are alkylene glycol diacrylates and alkylene glycol dimethacrylates, for example ethylene glycol diacrylate, propylene 1,2-glycol diacrylate, propylene 1,3-glycol diacrylate, butylene 1,3-glycol diacrylate, butylene 1,4-glycol diacrylate and ethylene glycol dimethacrylate, propylene 1,2-glycol dimethacrylate, propylene 1,3-glycol dimethacrylate, butylene glycol 1,3-dimethacrylate, butylene glycol 1,4-dimethacrylate, and also 1,2-, 1,3- or 1,4-divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Other materials of particular significance in this context are the C1-C8-hydroxyalkyl esters of methacrylic and of acrylic acid, for example 2-hydroxyethyl, 2-hydroxypropyl or 3-hydroxy- or 4-hydroxybutyl acrylate and the corresponding methacrylate, and also compounds such as diacetoneacrylamide and acetylacetoxyethyl acrylate and the corresponding methacrylate. Frequently, the aforementioned monomers are used in amounts of ≤10% by weight, but preferably in amounts ≤5% by weight, based in each case on the total amount of monomers P.

In a preferred embodiment, the monomers P in the preparation of the polymers P are selected to an extent of ≥90% by weight from the group comprising olefins, vinylaromatic monomers, vinyl halides, esters of vinyl alcohol and monocarboxylic acids having 1 to 18 carbon atoms, esters of α,β-monoethylenically unsaturated mono- and dicarboxylic acids having 3 to 6 carbon atoms with alkanols having 1 to 12 carbon atoms, nitriles of α,β-monoethylenically unsaturated carboxylic acids and $C_{4-8}$-conjugated dienes, and are selected to an extent of ≤10% by weight from the group comprising α,β-monoethylenically unsaturated mono- and dicarboxylic acids having 3 to 6 carbon atoms and amides thereof, and also monoethylenically unsaturated compounds having at least one amino, epoxy, hydroxyl, N-methylol or carbonyl group and compounds having at least two nonconjugated ethylenically unsaturated double bonds.

In a further preferred embodiment, the polymer P is prepared using

| ≥90% and ≤99.9% by weight of | styrene and/or methyl methacrylate, |
| ≥0% and ≤9.9% by weight of | n-butyl acrylate and/or 2-ethylhexyl acrylate, and |
| ≥0.1% and ≤10.0% by weight of | acrylic acid, methacrylic acid, glycidyl acrylate, glycidyl methacrylate, 2-hydroxyethyl, 2-hydroxypropyl and 3-hydroxypropyl acrylate and methacrylate, 2-aminoethyl, 2-aminopropyl and 3-aminopropyl acrylate and methacrylate, butylene 1,4-glycol diacrylate and -methacrylate, 1,2-, 1,3- and 1,4-divinylbenzene, allyl acrylate and/or allyl methacrylate, | where the amounts add up to 100% by weight.

In a further preferred embodiment, the polymer P is prepared using

| ≥90% and ≤99.9% by weight of | styrene and/or methyl methacrylate, |
| ≥0% and ≤9.9% by weight of | n-butyl acrylate and/or 2-ethylhexyl acrylate, and |
| ≥0.1% and ≤2.0% by weight of | butylene 1,4-glycol diacrylate and -methacrylate, 1,2-, 1,3- and 1,4-divinylbenzene, allyl acrylate and/or allyl methacrylate, | where the amounts add up to 100% by weight.

In a particularly preferred embodiment, the polymer P is prepared using

| | |
|---|---|
| ≥90% and ≤99.7% by weight of | styrene and/or methyl methacrylate, |
| ≥0% and ≤9.9% by weight of | n-butyl acrylate and/or 2-ethylhexyl acrylate, and |
| ≥0.1% and ≤5.0% by weight of | acrylic acid, methacrylic acid, 2-hydroxyethyl, 2-hydroxypropyl and 3-hydroxypropyl acrylate and methacrylate, 2-aminoethyl, 2-aminopropyl and 3-aminopropyl acrylate and/or methacrylate, |
| ≥0.1% and ≤2.0% by weight of | butylene 1,4-glycol diacrylate and -methacrylate, 1,2-, 1,3- and 1,4-divinylbenzene, allyl acrylate and/or allyl methacrylate, and |
| ≥0.1% and ≤4.0% by weight of | glycidyl acrylate and/or glycidyl methacrylate, | and especially

| | |
|---|---|
| ≥92% and ≤97.8% by weight of | styrene and/or methyl methacrylate, |
| ≥0.1% and ≤2.0% by weight of | acrylic acid and/or 2-hydroxyethyl acrylate, |
| ≥0.1% and ≤2.0% by weight of | butylene 1,4-glycol diacrylate and/or allyl methacrylate, and |
| ≥2.0% and ≤4.0% by weight of | glycidyl acrylate and/or glycidyl methacrylate, | where the amounts add up to 100% by weight in each case.

The free-radically initiated aqueous emulsion polymerization for preparation of the polymers P is generally conducted in the presence of 0.1% to 5% by weight, preferably 0.1% to 4% by weight and especially 0.1% to 3% by weight, based in each case on the total amount of monomers P, of a free-radical polymerization initiator (free-radical initiator). Useful free-radical initiators are all those initiators that are capable of triggering a free-radical aqueous emulsion polymerization. These may in principle be peroxides or azo compounds. Redox initiator systems are of course also contemplated. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts thereof, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis(2,4-dimethylvaleronitrile) and 2,2'-azobis(amidinopropyl) dihydrochloride (AIBA, corresponds to V-50 from Wako Chemicals). It is of course also possible to use so-called redox initiator systems as free-radical initiators. Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metalbisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

As well as the seed-free mode of preparation, the polymer particle size can also be adjusted by effecting the emulsion polymerization for preparation of the polymers P by the seed latex process or in the presence of a seed latex produced in situ. Processes for this purpose are known to those skilled in the art and can be found in the prior art (see, for example, EP-B 40 419, EP-A 567 812, EP-A 614 922 and 'Encyclopedia of Polymer Science and Technology', Vol. 5, page 847, John Wiley & Sons Inc., New York, 1966). For instance, the prior art recommends, in the semicontinuous feed process, initially charging a defined finely divided seed polymer dispersion in the aqueous polymerization medium and then polymerizing the monomers P in the presence of the seed latex. In this case, the seed polymer particles act as 'polymerization seeds' and decouple the polymer particle formation and polymer particle growth. During the emulsion polymerization, it is possible in principle to add further seed latex directly to the aqueous polymerization medium. This achieves broad size distributions of the polymer particles, which are often desirable especially in the case of polymer dispersions having a high solids content (in this regard, cf., for example, DE-A 4213965). Rather than the addition of a defined seed latex, it can also be produced in situ. For this purpose, for example, a portion of the monomers P used for polymerization and of the free-radical initiator is initially charged together with a portion or the entirety of the polymer A and, if appropriate, additional dispersing aids and heated to reaction temperature, forming a relatively finely divided polymer seed. Subsequently, in the same aqueous polymerization medium, the actual polymerization is conducted by the feed method (see also DE-A 4213965).

Advantageously, the polymers P are prepared by free-radically initiated aqueous emulsion polymerization at a reaction temperature in the range from 0 to 170° C., but particular preference is given to temperatures of 70 to 120° C. and especially 80 to 100° C. The free-radical aqueous emulsion polymerization can be conducted at a pressure less than, equal to or greater than 1 atm (absolute). Preference is given to polymerizing volatile monomers, such as ethylene, butadiene or vinyl chloride, under elevated pressure. In this case, the pressure may assume values of 1.2, 1.5, 2, 5, 10, 15 bar (gauge) or even higher values. If emulsion polymerizations are conducted under reduced pressure, pressures of 950 mbar, frequently of 900 mbar and often 850 mbar (absolute) are established. Advantageously, the free-radical aqueous emulsion polymerization of the monomers is conducted at atmospheric pressure (=1.013 bar absolute) or under elevated pressure under inert gas atmosphere, for example under nitrogen or argon.

In the free-radically initiated aqueous emulsion polymerization, the aqueous polymerization medium may in principle also comprise minor amounts (<5% by weight) of water-soluble organic solvents, for example methanol, ethanol, isopropanol, butanols, pentanols, but also acetone, etc. Preferably, however, the free-radically initiated aqueous emulsion polymerization is effected in the absence of such solvents.

The polymers P used in accordance with the invention have a glass transition temperature $Tg^P \geq 20°$ C. measured according to DIN EN ISO 11357-2 (2013-05). Advantageously, the glass transition temperature of the polymers P is within the range of $\geq 60°$ C., especially within the range of $\geq 60$ and $\leq 150°$ C. and particularly advantageously within the range of $\geq 90°$ C., especially within the range of $\geq 90$ and $\leq 120°$ C.

It is also significant that, according to Fox (T. G. Fox, Bull. Am. Phys. Soc. 1956 [Ser. II] 1, page 123 and according to Ullmann's Encyclopädie der technischen Chemie [Ullmann's Encyclopedia of Industrial Chemistry], vol. 19, page 18, 4th edition, Verlag Chemie, Weinheim, 1980), the glass transition temperature of at most lightly cross-linked copolymers can be estimated in a good approximation by the following equation:

$$1/Tg = x_1/Tg^1 + x_2/Tg^2 + \ldots x_n/T_g^n,$$

where $x_1, x_2, \ldots x_n$ are the mass fractions of the monomers $1, 2, \ldots n$ and $Tg^1, Tg^2, \ldots Tg^n$ are the glass transition temperatures in degrees kelvin of the homopolymers synthesized from only one of the monomers $1, 2, \ldots n$ at a time. The glass transition temperatures of these homopolymers of most ethylenically unsaturated monomers are known (or may be determined experimentally in a simple manner known per se) and are recited for example in J. Brandrup, E. H. Immergut, Polymer Handbook 1st Ed. J. Wiley, New York, 1966, 2nd Ed. J. Wiley, New York, 1975 and 3rd Ed. J. Wiley, New York, 1989, and also in Ullmann's Encyclopedia of Industrial Chemistry, page 169, Verlag Chemie, Weinheim, 1992.

The aqueous polymer P dispersions obtainable by emulsion polymerization typically have a solids content of $\geq 10\%$ and $\leq 70\%$ by weight, frequently $\geq 20\%$ and $\leq 65\%$ by weight and often $\geq 25\%$ and $\leq 60\%$ by weight, based in each case on the aqueous polymer dispersion.

Particularly advantageously, the polymers P are in the form of particles having an average particle diameter $\geq 10$ and $\leq 1000$ nm, advantageously $\geq 30$ and $\leq 600$ nm and particularly advantageously $\geq 100$ to $\leq 500$ nm, determined by the method of quasielastic light scattering (ISO Standard 13 321; cumulant z-average).

According to the invention, the weight ratio of polymers P (calculated as the total amount of monomers P) to polymers A in the preferred embodiment is within the range of $\geq 1$ and $\leq 10$, advantageously within the range of $\geq 1.5$ and $\leq 8$ and especially within the range of $\geq 2$ and $\leq 6$.

The mixing of fibrous substrate S and thermoplastic polymer P is effected in a manner familiar to the person skilled in the art, for example in a mixing drum, a fluidized bed or a blowline. It is advantageous here to use the mixing drum, operated continuously or batchwise, when the polymer P is used in neat form, for example as polymer powder or as polymer fibers, or in liquid form, especially as an aqueous dispersion. A fluidized bed is used for mixing of fibrous substrate S and polymer P especially when the polymer P is in the form of polymer fibers. A blowline is employed especially when the fibrous substrate S has been produced by comminuting wood in a refiner and the polymer P is used in the form of an aqueous dispersion.

However, it is significant that the substrate S used in accordance with the invention can be produced by the process described above either by mixing separately produced acetylated and non-acetylated lignocellulosic fibers or by fiber production proceeding from a corresponding mixture of acetylated and non-acetylated wood.

It is also significant that the substrate S/polymer P mixture produced in process step i) can be produced either by mixing substrate S with polymer P or by mixing a mixture of acetylated lignocellulosic fibers and polymer P and a mixture of non-acetylated lignocellulosic fibers and polymer P.

After the mixing step, the resulting substrate S/polymer P mixture is converted to a fiber web, which is subsequently compacted at a temperature $\geq Tg^P$ to give a thermoformable and/or embossable fiber/polymer composite.

Advantageously, the process of the invention is effected in such a way that the polymer P is used in the form of an aqueous dispersion, wherein, after process stage i) and/or during and/or after process stage ii), a drying step is effected, for example in a drying tower or fluidized bed drier after process stage i) or by means of a hot air blower during or after process stage ii).

Particularly advantageously, the process of the invention is effected in such a way that the substrate S is introduced into a gas stream [process stage ia)], then the substrate S in the gas stream is contacted and mixed homogeneously with an aqueous dispersion of a polymer P [process stage ib)], then the resulting substrate S/polymer P mixture is dried in a gas stream and then deposited [process stage ic)], then the resulting deposited substrate S/polymer P mixture is converted to a fiber web [process stage ii)], and then the fiber web obtained is consolidated at a temperature $\geq Tg^P$ to give a fiber/polymer composite [process stage iii)].

In the context of the present invention, a gas stream shall be understood to mean the directed transport of a gaseous substance along a pressure gradient, for example in a vessel or in a tube. In principle, it is possible to use all substances which are gaseous under the transport conditions (especially pressure and temperature). For example, organic and/or inorganic solvent vapors are used, such as, especially advantageously, water vapor or nitrogenous gas mixtures such as air in particular. Advantageously in accordance with the invention, water vapor/air mixtures are used in a wide mixing ratio, as occur especially in wood fiber production in a blowline.

Particularly advantageously in accordance with the invention, the substrate S is contacted with an aqueous polymer P dispersion in a gas stream. If this contacting is effected in a blowline, advantageously via one or more injection nozzles, it should be ensured that the contacting with the aqueous polymer P dispersion in the blowline is effected, in flow direction, at one or more sites before the heated dry air for drying of the wood fibers is blown in.

Subsequently, the fibrous substrate that has been contacted with the aqueous polymer P dispersion is finish-dried in the gas stream and then deposited. The drying of the resulting substrate S/polymer P mixture is effected, for example, by removal and condensation of the water vapor or in a blowline by introduction of a sufficient amount of heated dry air that the relative air humidity in the resulting gas mixture is lowered to $\leq 10\%$ or even $\leq 5\%$. This measure results in the drying of the resulting substrate S/polymer P mixture. In the context of this document, drying shall be understood to mean lowering of the residual moisture content of the resulting substrate S/polymer P mixture to ≤15% by weight and advantageously to ≤10% by weight, preferably to ≥5% and ≤10% by weight. Residual moisture content of substrate S/polymer P mixture shall be understood to mean the percentage difference in weight, based on the substrate S/polymer P mixture used, which results when 1 g of substrate S/polymer P mixture is dried in a drying cabinet at 120° C. for one hour. The dried substrate S/polymer P mixture is deposited by the customary methods for separation of solids out of gas mixtures, for example by means of sieves or by exploitation of centrifugal forces via cyclone separators.

Subsequently, the deposited substrate S/polymer P mixture obtained, in accordance with the invention, is converted to a fiber web, for example by appropriate scattering of the deposited substrate S/polymer P mixture onto an area or, in continuous operation, onto a conveyor belt. This fiber web may, in accordance with the invention, optionally after mechanical pre-consolidation at a temperature well below the glass transition temperature $Tg^P$, have a thickness of ≥1 and ≤50 cm, advantageously ≥1 and ≤30 cm and especially advantageously ≥1 and ≤15 cm, and a density of ≥20 and ≤700 g/l, often ≥50 and ≤500 g/l and frequently ≥100 and ≤350 g/l.

Subsequently, the fiber web thus obtained is consolidated at a temperature ≥$Tg^P$ to give a thermoformable and/or -embossable fiber/polymer composite. Consolidation here is understood to mean compression of the fiber web at a temperature ≥$Tg^P$ under pressure to give a thermoformable and/or -embossable fiber/polymer composite. This increases the density of the fiber/polymer composite compared to the corresponding fiber web, depending on the fibrous substrate S used, by a factor of ≥3 and advantageously by a factor of ≥6. In a corresponding manner, there is also a decrease in the thickness of the fiber/polymer composite compared to the corresponding fiber web. What is significant in this connection is that the fiber/polymer composite of the invention advantageously has a two-dimensional flat shape. It will be appreciated that the fiber/polymer composite of the invention may alternatively—depending on the press mold chosen—have any desired non-flat three-dimensional forms.

In the production of the fiber/polymer composite, advantageously ≥0.1% and ≤30% by weight and particularly advantageously ≥1% and ≤25% by weight and advantageously ≥5% and ≤20% by weight of polymers P (calculated as the total amount of monomers P), based on the amount of fibrous substrate S, is used.

By the process of the invention, in particular, fiber/polymer composites having a basis weight of ≥500 and ≤30 000 g/m², especially advantageously ≥1000 and ≤20 000 g/m² and advantageously ≥1000 and ≤10 000 g/m² are obtainable. In this context, the thermoformable and/or -embossable fiber/polymer composites obtainable by the process of the invention, in a preferred embodiment, are two-dimensional, whereas, in a further preferred embodiment, they have a non-flat three-dimensional structure.

The invention accordingly also encompasses the thermoformable and/or -embossable fiber/polymer composites as obtainable by the process of the invention.

In a corresponding manner, the invention also encompasses the use of a fiber/polymer composite of the invention for production of a fiber/polymer molding which differs from the thermoformable and/or -embossable fiber/polymer composite used in terms of its shape and/or surface structure.

Accordingly, the invention also encompasses a process for producing a fiber/polymer molding, which comprises heating a thermoformable and/or -embossable fiber/polymer composite of the invention up to a temperature ≥$Tg^P$, converting the fiber/polymer composite thus obtained at a temperature ≥$Tg^P$ to the desired shape and/or surface structure of the fiber/polymer molding and then cooling the fiber/polymer molding obtained down to a temperature <$Tg^P$ while retaining its shape and/or surface structure.

According to the invention, the fiber/polymer composite is heated up to a temperature corresponding at least to the glass transition temperature $Tg^P$ of the polymer P. Advantageously, the fiber/polymer composite is heated up to a temperature $Tg^P$ plus ≥10° C. and particularly advantageously $Tg^P$ plus ≥30° C., and the fiber/polymer molding obtained is cooled down to a temperature $Tg^P$ minus ≥10° C. and particularly advantageously $Tg^P$ minus ≥30° C.

It is also significant that the fiber/polymer molding, in a preferred embodiment, is produced by means of a heated mold press, at least one contact surface of which has a temperature ≥$Tg^P$ and optionally a defined surface structure (i.e. a pattern projecting out of and/or into the contact surface), and the form of which corresponds to the negative mold of the fiber/polymer molding and the cooling of which is effected outside the mold press. In this embodiment, the heating operation and forming operation are effected in the heated mold press. It will be appreciated that it is also possible in accordance with the invention that the fiber/polymer composite is heated up to a temperature ≥$Tg^P$ outside the mold press and then formed within the mold press without further heating to give the fiber/polymer molding while being cooled to a temperature <$Tg^P$. In this preferred embodiment, the heating operation and the deforming/cooling operation are effected separately.

In a further preferred embodiment, the operation of heating the fiber/polymer composite is effected by means of passage between two metal rolls in an axially parallel arrangement that rotate in the direction of passage, wherein
a) at least one of the metal rolls has a defined surface structure of the contact surface to the fiber/polymer composite and a temperature ≥$Tg^P$,
b) the gap between the contact surfaces of the two metal rolls is less than the thickness of the fiber/polymer composite, and
c) the passage of the fiber/polymer composite between the contact surfaces of the two metal rolls is at the speed corresponding to the speed of rotation of the contact surfaces of the two metal rolls.

It is self-evident to the person skilled in the art here that the defined surface structure of the contact surface of the at least one metal roll constitutes the negative of the surface structure formed on the fiber/polymer molding. It is also self-evident that the difference between the thickness of the fiber/polymer composite and the gap between the contact surfaces of the two metal rolls corresponds to the maximum depth of the positive surface structure formed on the fiber/polymer molding. In the present embodiment, the gap width advantageously corresponds to the thickness of the fiber/polymer composite multiplied by a factor of ≤0.98, particularly advantageously by a factor of ≤0.9 and especially advantageously by a factor of ≤0.8. In order that the positive surface structures can form optimally on the fiber/polymer molding, it is obligatory that the passage of the fiber/polymer composite between the contact surfaces of the two metal rolls is at the speed (in m/sec) corresponding to the speed of rotation of the contact surfaces (in m/sec) of the two metal rolls. This embodiment is especially suitable for production of two-dimensionally flat fiber/polymer moldings having a marked surface structure.

The thickness of the fiber/polymer composite prior to the heating operation is generally in the range of ≥1 mm and ≤10 cm, frequently in the range of ≥1 mm and ≤3 cm and often in the range of ≥1 mm and ≤1 cm.

In a further advantageous embodiment, the process of the invention is effected in such a way that, before or after the heating operation but before the forming step, an intermediate process step is also conducted in which a two-dimensional decor material having a thickness of ≤10 mm is applied to one and/or the other surface of the fiber/polymer composite.

The decor material usable in accordance with the invention is advantageously a textile fabric, for example a nonwoven material, a weave or a knit made from natural or synthetic fibers, a polymer film, for example a thermoplastic polyvinyl chloride, polyolefin or polyester film, a highly filled paper such as, in particular, what is called a melamine resin film, what is called a high-pressure laminate (HPL) or what is called a continuous pressure laminate (CPL), a decorative paper, a wood veneer, or a foamed sheetlike material, for example a sheetlike material composed of a polyolefin or polyurethane foam, a foamed sheetlike material which has in turn been coated (laminated) on the surface that does not come into contact with the heated fiber/polymer composite with a textile fabric, a polymer film or a further foamed sheetlike material.

The two-dimensional decor material generally has a thickness of ≤10 mm. If the two-dimensional decor material is a textile fabric or a polymer film, the thickness thereof is generally ≤3 mm, frequently advantageously ≤2 mm and frequently especially advantageously ≤1 mm. If, however, the two-dimensional decor material is a foamed sheetlike material or a coated (laminated) foamed sheetlike material, the thickness thereof is frequently ≤8 mm, often ≤5 mm and particularly often ≤3 mm. If the two-dimensional decor material is a wood veneer, however, the thickness thereof is generally ≤3 mm, frequently advantageously ≤2 mm and frequently especially advantageously ≤1 mm.

The invention therefore also encompasses the fiber/polymer moldings obtainable by the aforementioned process.

It is also significant in accordance with the invention that both the process for production of the thermoformable and/or -embossable fiber/polymer composite and the process for production of the fiber/polymer molding can be effected continuously or batchwise.

It is also significant that, in the case of a fiber/polymer molding (and of course also in the case of the corresponding fiber/polymer composite), depending on the type and amount of substrate S and the type and amount of polymer P, for a given basis weight, the thickness swelling that results from contact with water can be adjusted within a defined range. The maximum value of thickness swelling is found when, for a given type and amount of polymer P and a given basis weight, a fiber/polymer molding (fiber/polymer composite) is produced using a given type and amount of a substrate S completely without acetylated fibers, and the thickness swelling thereof is determined. If, in a second experiment, an analogous fiber/polymer molding (fiber/polymer composite) is then produced under identical conditions, except that the total amount of the substrate S consists exclusively of the corresponding acetylated fibers, and the thickness swelling thereof is determined, the minimum possible value of thickness swelling is obtained. It is then possible, by means of the appropriate proportion of acetylated fibers in the substrate S, for a given type and amount of a polymer P, a given type and amount of a substrate S and a given basis weight, to control the thickness swelling between the minimum and maximum values.

The fiber/polymer moldings obtainable in accordance with the invention have good thermal dimensional stability and improved water resistance, and are therefore advantageously suitable as a component in motor vehicle construction, for example as a door insert, door decor element, knee bolster, glovebox, parcel shelf, sunvisor, center console, rear trunk cladding or seat back cladding, in built structures, for example as roof tile or floor element, especially click laminate, for example as a room divider, dividing wall, cover panel, door leaf or wall decor part, and in furniture as a furniture molding, for example as a seat or backrest surface. The use of the fiber/polymer moldings as component in motor vehicle construction, in built structures and in furniture is therefore preferred in accordance with the invention.

The present document accordingly comprises the following embodiments in particular:

1.) A process for producing a thermoformable and/or -embossable fiber/polymer composite using a fibrous lignocellulosic substrate S and a polymer P, which comprises
   i) homogeneously mixing the substrate S and the polymer P, then
   ii) converting the substrate S/polymer P mixture to a fiber web, and then
   iii) compacting the resultant fiber web at a temperature not less than the glass transition temperature of the polymer P [$Tg^P$] to give a thermoformable and/or -embossable fiber/polymer composite,
   wherein
   a) the substrate S comprises acetylated lignocellulosic fibers, and
   b) the polymer P is thermoplastic and has a $Tg^P \geq 20°$ C. measured to DIN EN ISO 11357-2 (2013-05).

2.) The process according to embodiment 1, wherein the polymer P is used in the form of an aqueous dispersion, with a drying step after process stage i) and/or during and/or after process stage ii).

3.) The process according to embodiment 2, wherein the aqueous dispersion of the polymer P is obtained by free-radically initiated emulsion polymerization of ethylenically unsaturated monomers P [monomers P] in an aqueous medium in the presence of a polymer A, where the polymer A is formed from
   a) 80% to 100% by weight of at least one ethylenically unsaturated mono- and/or dicarboxylic acid [monomers A1] and
   b) 0% to 20% by weight of at least one further ethylenically unsaturated monomer which differs from the monomers A1 [monomers A2], in copolymerized form,
   and where the monomers P are chosen in terms of type and amount such that the resulting polymer P has a $Tg^P \geq 20°$ C.

4.) The process according to either of embodiments 2 and 3, wherein
   the substrate S is introduced into a gas stream [process stage ia)], then
   the substrate S in the gas stream is contacted and mixed homogeneously with an aqueous dispersion of a polymer P [process stage ib)], then
   the resulting substrate S/polymer P mixture is dried in a gas stream and then deposited [process stage ic)], then
   the resulting deposited substrate S/polymer P mixture is converted to a fiber web [process stage ii)], and then
   the fiber web obtained is consolidated at a temperature $\geq Tg^P$ to give a fiber/polymer composite [process stage iii)].

5.) The process according to either of embodiments 3 and 4, wherein the weight ratio of polymer P to polymer A is ≥1 and 10.
6.) The process according to any of embodiments 3 to 5, wherein the polymer A has a number-average molecular weight of ≥1000 and ≤30 000 g/mol.
7.) The process according to any of embodiments 1 to 6, wherein the polymer P is prepared using

| ≥90% and ≤99.9% by weight of | styrene and/or methyl methacrylate, |
| ≥0% and ≤9.9% by weight of | n-butyl acrylate and/or 2-ethylhexyl acrylate, and |
| ≥0.1% and ≤10.0% by weight of | acrylic acid, methacrylic acid, glycidyl acrylate, glycidyl methacrylate, n-hydroxyethyl and n-hydroxypropyl acrylate and methacrylate, n-aminoethyl and n-aminopropyl acrylate and methacrylate, butylene 1,4-glycol diacrylate and methacrylate, 1,2-, 1,3- and 1,4-divinylbenzene, allyl acrylate and/or allyl methacrylate, | where the amounts add up to 100% by weight.
8.) The process according to any of embodiments 1 to 7, wherein the substrate S comprises ≥50% by weight of acetylated lignocellulosic fibers.
9.) The process according to any of embodiments 1 to 8, wherein the substrate S consists to an extent of 100% by weight of acetylated lignocellulosic fibers.
10.) The process according to any of embodiments 1 to 9, wherein the resultant fiber/polymer composite is two-dimensional and has a basis weight of ≥500 and ≤30 000 g/m².
11.) A fiber/polymer composite obtainable by a process according to any of embodiments 1 to 10.
12.) The use of a fiber/polymer composite according to embodiment 11 for production of a fiber/polymer molding that differs in its shape and/or surface structure from the fiber/polymer composite used.
13.) A process for producing a fiber/polymer molding, which comprises heating a thermoformable and/or -embossable fiber/polymer composite according to embodiment 11 up to a temperature ≥$Tg^P$, converting the fiber/polymer composite thus obtained at a temperature ≥$Tg^P$ to the desired shape and/or surface structure of the fiber/polymer molding and then cooling the fiber/polymer molding obtained down to a temperature <$Tg^P$ while retaining its shape and/or surface structure.
14.) A fiber/polymer molding obtainable by a process according to embodiment 13.
15.) The use of the fiber/polymer molding according to embodiment 14 as component in motor vehicle construction, in built structures and in furniture.

The present invention will be illustrated by nonlimiting examples which follow.

EXAMPLES

Preparation of an aqueous polymer P1 dispersion (dispersion 1)

A 500 l pilot plant reactor equipped with a stirrer, a reflux condenser and metering devices was initially charged at 20 to 25° C. (room temperature) and under a nitrogen atmosphere with 36.5 kg of deionized water, and heated up to 95° C. under atmospheric pressure (1 atm=1.013 bar absolute) while stirring. On attainment of this temperature, 14.0 kg of a 7% by weight aqueous solution of sodium persulfate were metered in continuously while stirring within 10 minutes. Subsequently, the following were metered continuously into the reaction vessel at constant flow rates while stirring and while maintaining the aforementioned temperature, each commencing at the same time: a mixture of 61.6 kg of acrylic acid, 3.2 kg of methyl methacrylate and 40.5 kg of deionized water within 70 minutes, and a mixture of 14.0 kg of a 40% by weight aqueous solution of sodium hydrogensulfite and 1.4 kg of deionized water, likewise within 70 minutes, and 32.5 kg of a 7% by weight aqueous solution of sodium persulfate within 75 minutes. Subsequently, the polymerization mixture was stirred for a further 5 minutes and then cooled down to 93° C. Thereafter, 13.9 kg of 25% by weight sodium hydroxide solution were metered in while stirring within 10 minutes and hence a pH of 3.3 was established, followed by stirring for a further 5 minutes. Subsequently, feed 1 was metered in within 170 minutes, with addition first of 48% by weight of feed 1 within 20 minutes and then of 52% by weight of feed 1 within 150 minutes—each continuously at constant flow rates. Feed 1 consisted of 21.8 kg of a 7% by weight aqueous solution of sodium persulfate. 5 minutes after the start of feed 1, feed 2 was metered in continuously at constant flow rate while maintaining the aforementioned polymerization temperature within 150 minutes. Feed 2 consisted of a homogeneous emulsion produced from 28.4 kg of deionized water, 3.86 kg of a 28% by weight aqueous solution of sodium lauryl ether sulfate (Disponil° FES 27; product from BASF SE), 2.88 kg of a 15% by weight aqueous solution of sodium dodecylsulfate (Disponil® SDS 15; product from BASF SE), 4.54 kg of glycidyl methacrylate, 1.06 kg of butane-1,4-diol diacrylate, 57.00 g of methyl methacrylate, 86.48 kg of styrene and 2.12 kg of acrylic acid. After the addition of feed 1 had ended, stirring was continued for another 10 minutes. Subsequently, 108 g of a defoamer (TEGO® Foamex 822; product from Evonik Resource Efficiency GmbH) were added. Thereafter, the polymerization mixture was cooled down to 90° C., and feeds 3 and 4, commencing simultaneously, were added continuously at constant flow rates within 30 minutes. Feed 3 consisted of 650 g of a 10% by weight aqueous solution of tert-butyl hydroperoxide, and feed 4 consisted of 820 g of a 13.1% by weight solution of acetone bisulfite (molar 1:1 addition product of acetone and sodium hydrogensulfite). Thereafter, the polymerization mixture obtained was cooled down to room temperature and filtered through a 125 μm filter. The aqueous polymer dispersion obtained had a solids content of 53.5% by weight and a pH of 3.5. The number-average particle size was determined as 347 nm and the glass transition temperature as 103° C.

The solids content was generally determined with a Mettler Toledo moisture analyzer by drying of 0.5 to 1 g of a polymer dispersion or polymer solution obtained to constant weight at 140° C.

The glass transition temperature was generally determined with the aid of a TA Instruments Q 2000 differential calorimeter to DIN EN ISO 11357-2 (2013-05). The heating rate was 10 K per minute.

The number-average particle size of the dispersion particles was generally determined by dynamic light scattering on a 0.005 to 0.01% by weight aqueous dispersion at 23° C. using an Autosizer IIC from Malvern Instruments, England. What is reported is the cumulant z-average diameter of the measured autocorrelation function (ISO Standard 13321).

The pH values were generally determined by analyzing a sample with a Schott pH electrode at room temperature.

Performance Testing

The lignocellulosic fibers were produced using chips of spruce wood and acetylated pine wood (Accoya® wood from Accsys Technologies Plc).

The studies were conducted with a 12 inch refiner from Andritz and a blowline connected thereto. The refiner was operated at 160 to 170° C. and an internal pressure of 5 to 6 bar (gauge). The distance between the two grinding plates was 0.3 mm, and one of the grinding plates was operated at 3000 revolutions per minute. The blowline (steel tube) connected to the refiner via a flange had an internal diameter of 3 cm and a tube length of 30 m. Through a 0.2 mm nozzle which was in the blowline at a distance of 50 cm from the refiner outlet/blowline inlet, the aqueous dispersion 1 was then injected into the blowline at 2 bar (gauge). At the end of the blowline was a cyclone separator, by means of which the coated wood fibers were dried further, and cooled down to a temperature of about 80° C. and deposited into an open vessel. Thereafter, the fibers obtained in each case were stored in a climate-controlled room at 23° C. and 50% relative air humidity for 24 hours.

For the production, the respective woodchips were first pretreated in a "boiler" with water/steam at 160 to 170° C. at 5 to 6 bar (gauge), then these were transferred into the refiner, with the mass flow rate of woodchips into the refiner (or wood fibers into the blowline) set at 30 kg per hour in each case. In parallel, 9.9 kg of dispersion 1 (corresponding to 5.3 kg/h of solids) per hour were injected continuously into the blowline through the 0.2 mm nozzle at a pressure of 2 bar (gauge) by means of an eccentric screw pump. The respective experiments were effected over the course of 2 hours in a continuous steady state, obtaining the respective wood fibers that comprised 17.7% by weight of binder (in solid form). The coated fibers thus obtained in each case were stored in a climate-controlled room at 23° C. and 50% relative air humidity for 24 hours. The fiber/binder combinations obtained, depending on the woodchips used, are referred to hereinafter as APB in the case of the woodchips of acetylated pine wood, and as SB fibers in the case of the woodchips of spruce wood.

Study of the Mechanical Properties

Coated APB fibers and SB fibers obtained from the blowline according to the aforementioned experimental procedure were used to produce homogeneous APB/SB fiber mixtures by means of a Lödige FM130D solid-state mixer. Depending on the proportion by weight of the APB fibers in the APB/SB fiber mixtures, these are referred to hereinafter as APB25 fibers (in the case of a proportion of 25% by weight of APB fibers), as APB50 fibers (in the case of a proportion of 50% by weight of APB fibers), and as APB75 fibers (in the case of a proportion of 75% by weight of APB fibers).

The aforementioned APB, SB, APB25, APB50 and APB75 fibers were used to produce 51×51 cm fiberboards with a thickness of 4.5 mm and a density of 0.7 g/cm³. For this purpose, 820 g of the aforementioned fibers or homogeneous fiber mixtures were scattered homogeneously into a horizontal wood frame having internal dimensions of 51×51×30 cm (L/B/H). Thereafter, a 51×51 cm wooden board was placed horizontally onto the fiber web present within the wooden frame and the fiber web was subjected to preliminary compaction to a height of 10 cm with a ram in the middle. The fiber cake thus obtained was then taken out of the wooden frame, covered with a release paper on both square faces and compacted to a thickness of 4.5 mm between two 10 mm-thick horizontal separation plates at 200° C. under pressure at a compression rate of 1 millimeter per 10 seconds, with the lower face of the fiber cake placed onto the lower horizontal separation plate in each case. Thereafter, the fiberboards obtained in each case were left to cool down to room temperature outside the press. The fiberboards obtained in each case were then stored in a climate-controlled room at 23° C. and 50% relative air humidity for one week. The fiberboards thus obtained are referred to as APB, SB and APB25, APB50 and APB75 fiberboards depending on the fibers used.

After the aforementioned fiberboards had been stored in the climate-controlled room, the residual moisture content thereof was determined. The residual moisture content was determined in such a way that a sample of the respective fiberboard (about 0.5 g) was heated to constant weight at 120° C. in a moisture analyzer from Satorius, model: MA 100. The moisture content is found as the difference in the respective sample before and after the heating operation, based in each case on the respective sample prior to the heating operation. The residual moisture contents were determined on two separate samples in each case. The values reported in table 1 correspond to the averages from these determinations.

TABLE 1

Residual moisture contents of the fiberboards

| Fiberboard | Residual moisture content [in % by wt.] |
| --- | --- |
| SB | 8.3 |
| APB25 | 4.4 |
| APB50 | 3.8 |
| APB75 | 3.3 |
| APB | 2.8 |

In a second compaction operation, the aforementioned fiberboards were compressed to a thickness of 3.5 mm, corresponding to a density of 0.9 g/cm³, in a heated press at 160° C. within 60 seconds, using an embossed plate to impress a sharp-edged engraving with a depth of 0.1 to 1.0 mm in each case.

A visual assessment was made of the embossing of the fiberboards obtained after this recompaction, and the water absorption and thickness swelling were determined.

The assessment of embossability was made by visually assessing the edges of the embossment with a magnifying glass (with 12-fold magnification) on the fiberboards obtained in each case 24 hours after they had been produced. Embossability was assessed as good (+) when the edges of the embossments did not have any visibly protruding or loose fibers [=roughness]. By contrast, if the edges of the embossments had visible protruding or loose fibers, embossability was assessed as inadequate (−). The corresponding results are listed in table 2.

The water absorption and thickness swelling were determined in such a way that corresponding 5×5 cm test specimens were sawn out of the fiberboards and these were then weighed accurately and their thicknesses were determined exactly. Subsequently, these test specimens were stored horizontally in deionized water at 23° C. for 24 hours, with the respective test specimens fully surrounded by water, then dabbed dry with a cotton cloth and then weighed, and the thickness of the individual test specimens was determined. The water absorption (in % by weight) was determined here from the difference in weight of the test specimens after and before the water storage multiplied by 100, divided by the respective weight before the water storage. In a corresponding manner, the thickness swelling was also determined from the difference in the thickness of the test specimens after and before the water storage multiplied by 100, divided by the thickness of the test specimens before the water storage. 5 test specimens were produced from each fiberboard and used for the tests. The test values reported below are the averages of these 5 measurements. The lower the water absorption and the lower the thickness swelling, the better the assessment of the water resistance. The results obtained for the respective test specimens are likewise listed in table 2.

TABLE 2

Results of embossability, water absorption and thickness swelling

| Test specimen | Water absorption [in % by wt.] | Thickness swelling [in %] | Embossability |
|---|---|---|---|
| SB | 137 | 68 | + |
| APB25 | 108 | 51 | + |
| APB50 | 92 | 37 | + |
| APB75 | 63 | 25 | + |
| APB | 45 | 9 | + |

It is significant in this connection that identical SB fiberboards were produced in multiple preliminary experiments, but the residual moisture contents thereof—with the same amount of binder in each case—were set within the range from 3% to 10% by weight in a controlled manner. These SB fiberboards, in a second compaction operation, were likewise—as described above—compressed to a thickness of 3.5 mm in a heating press at 160° C. and correspondingly embossed. In the assessment of the corresponding embossments, however, it was found that only SB fiberboards that were obtained from SB fiberboards having a residual moisture content of >5% by weight, for example 5.5% by weight or 8.3% by weight, had good embossability. SB fiberboards that were produced from SB fiberboards having a residual moisture content of ≤5% by weight, for example 4.5% by weight or 3.3% by weight, generally had inadequate embossability. This was because the corresponding embossments, immediately after the embossing operation, were inadequately or incompletely formed by virtue of rounded edges and/or nonattainment of the embossment depth, or the embossments that initially appeared to have succeeded degenerated again within a few hours and hence gave indistinct ('blurred'), entirely inadequate embossments by virtue of likewise rounded edges and/or inadequate embossment depths.

Against this background, it was completely surprising to the person skilled in the art that fiber/polymer composites comprising acetylated lignocellulosic fibers and having residual moisture contents of ≤5% by weight can not only be converted advantageously to fiber/polymer moldings having water absorption and/or thickness swelling controllable within a given range but can also be shaped efficiently and embossed advantageously.

We claim:
1. A process for producing a thermoformable and/or -embossable fiber/polymer composite using a fibrous lignocellulosic substrate S and a polymer P, which comprises
   i) homogeneously mixing the substrate S and the polymer P, then
   ii) converting the substrate S/polymer P mixture to a fiber web, and then
   iii) compacting the resultant fiber web at a temperature not less than the glass transition temperature of the polymer P [$Tg^P$] to give a thermoformable and/or -embossable fiber/polymer composite,
   wherein
   a) the substrate S comprises acetylated lignocellulosic fibers, and
   b) the polymer P is thermoplastic and has a $Tg^P \geq 20°$ C. measured to DIN EN ISO 11357-2(2013-05).

2. The process according to claim 1, wherein the polymer P is used in the form of an aqueous dispersion, with a drying step after process stage i) and/or during and/or after process stage ii).

3. The process according to claim 2, wherein the aqueous dispersion of the polymer P is obtained by free-radically initiated emulsion polymerization of ethylenically unsaturated monomers P [monomers P] in an aqueous medium in the presence of a polymer A, where the polymer A is formed from
   a) 80% to 100% by weight of at least one ethylenically unsaturated mono- and/or dicarboxylic acid [monomers A1] and
   b) 0% to 20% by weight of at least one further ethylenically unsaturated monomer which differs from the monomers A2 [monomers A2], in copolymerized form,
   and where the monomers P are chosen in terms of type and amount such that the resulting polymer P has a $Tg^P \geq 20°$ C.

4. The process according to claim 2, wherein
   the substrate S is introduced into a gas stream [process stage ia)], then
   the substrate S in the gas stream is contacted and mixed homogeneously with an aqueous dispersion of a polymer P [process stage ib)], then
   the resulting substrate S/polymer P mixture is dried in a gas stream and then deposited [process stage ic)], then
   the resulting deposited substrate S/polymer P mixture is converted to a fiber 10 web [process stage ii)], and then
   the fiber web obtained is consolidated at a temperature $\geq Tg^P$ to give a fiber/polymer composite [process stage iii)].

5. The process according to claim 3, wherein the weight ratio of polymer P to polymer A is $\geq 1$ and $\leq 10$.

6. The process according to claim 3, wherein the polymer A has a number-average molecular weight of $\geq 1000$ and $\leq 30\,000$ g/mol.

7. The process according to claim 1, wherein the polymer P is prepared using $\geq 90\%$ and $\leq 99.9\%$ by weight of styrene and/or methyl methacrylate,
   $\geq 0\%$ and $\leq 9.9\%$ by weight of n-butyl acrylate and/or 2-ethylhexyl acrylate, and
   $\geq 0.1\%$ and $\leq 10.0\%$ by weight of acrylic acid, methacrylic acid, glycidyl acrylate, glycidyl methacrylate, n-hydroxyethyl and n-hydroxypropyl acrylate and methacrylate, n-aminoethyl and n-aminopropyl acrylate and methacrylate, butylene 1,4-glycol diacrylate and methacrylate, 1,2-, 1,3- and 1,4- divinylbenzene, allyl acrylate and/or allyl methacrylate,
   where the amounts add up to 100% by weight.

8. The process according to claim 1, wherein the substrate S comprises ≥50% by weight of acetylated lignocellulosic fibers.

9. The process according to claim 1, wherein the substrate S consists to an extent of 100% by weight of acetylated lignocellulosic fibers.

10. The process according to claim 1, wherein the resultant fiber/polymer composite is two-dimensional and has a basis weight of ≥500 and ≤30 000 g/m².

11. A process for producing a fiber/polymer molding, which comprises heating the thermoformable and/or -embossable fiber/polymer composite obtained by the process according to claim 1 up to a temperature ≥$Tg^P$, converting the fiber/polymer composite thus obtained at a temperature ≥$Tg^P$ to the desired shape and/or surface structure of the fiber/polymer molding and then cooling the fiber/polymer molding obtained down to a temperature <$Tg^P$ while retaining its shape and/or surface structure.

* * * * *